US006839671B2

(12) United States Patent
Attwater et al.

(10) Patent No.: US 6,839,671 B2
(45) Date of Patent: Jan. 4, 2005

(54) LEARNING OF DIALOGUE STATES AND LANGUAGE MODEL OF SPOKEN INFORMATION SYSTEM

(75) Inventors: David J. Attwater, Ipswich (GB); Michael D. Edgington, Bridgewater, MA (US); Peter J. Durston, Suffolk (GB)

(73) Assignee: British Telecommunications public limited company, London (GB)

( * ) Notice: Subject to any disclaimer, the term of this patent is extended or adjusted under 35 U.S.C. 154(b) by 46 days.

(21) Appl. No.: 10/130,483

(22) PCT Filed: Dec. 19, 2000

(86) PCT No.: PCT/GB00/04904

§ 371 (c)(1),
(2), (4) Date: May 20, 2002

(87) PCT Pub. No.: WO01/46945

PCT Pub. Date: Jun. 28, 2001

(65) Prior Publication Data

US 2003/0091163 A1 May 15, 2003

(30) Foreign Application Priority Data

Dec. 20, 1999 (EP) .............................................. 99310265

(51) Int. Cl.[7] .............................................. G10L 15/28
(52) U.S. Cl. ....................... 704/255; 704/257; 704/245; 704/238
(58) Field of Search ................................ 704/255, 257, 704/245, 236, 238, 200

(56) References Cited

U.S. PATENT DOCUMENTS

| | | | | |
|---|---|---|---|---|
| 4,922,519 A | * | 5/1990 | Daudelin ................. | 379/88.01 |
| 5,163,083 A | * | 11/1992 | Dowden ................... | 379/88.03 |
| 5,457,768 A | * | 10/1995 | Tsuboi ........................ | 704/231 |
| 5,675,707 A | * | 10/1997 | Gorin ......................... | 704/257 |
| 5,794,193 A | * | 8/1998 | Gorin ......................... | 704/250 |
| 5,825,977 A | * | 10/1998 | Morin ......................... | 704/255 |
| 6,173,261 B1 | * | 1/2001 | Arai ........................... | 704/257 |
| 6,208,967 B1 | * | 3/2001 | Pauws ........................ | 704/256 |

FOREIGN PATENT DOCUMENTS

| | | | | |
|---|---|---|---|---|
| EP | 0890942 A3 | 4/1999 | | |
| GB | 0 890 942 A2 | * 2/1999 | ............ | G10A/5/06 |
| JP | 07104786 A | * 4/1995 | ............. | G10L/3/00 |

OTHER PUBLICATIONS

Natividad, Prieto. "Learning Language Models Through the ECGI Method," Speech Communication, NL. Elsevier Science Publishers, Amsterdam, vol. 11, No. 2/03, Jun. 1, 1992, pp. 299–309.*
Gorin et al., "How May I Help You?", Speech Communication, vol. 23 (1997), pp. 113–127.
Kita et al., "Automatic Acquisition of Probabilistic Dialogue Models", Procs ISSD 96, Philadelphia, pp. 109–112.
Lee et al., "A Study on Natural Language Call Routing", Procs Workshop on Interactive Voice Technology for Telecommunications Applications, Turin, 1998, pp. 37–42.

(List continued on next page.)

Primary Examiner—Richemond Dorvil
Assistant Examiner—Kinari Patel
(74) Attorney, Agent, or Firm—Nixon & Vanderhye P.C.

(57) ABSTRACT

In this invention dialogue states for a dialogue model are created using a training corpus of example human—human dialogues. Dialogue states are modelled at the turn level rather than at the move level, and the dialogue states are derived from the training corpus. The range of operator dialogue utterances is actually quite small in many services and therefore may be categorized into a set of predetermined meanings. This is an important assumption which is not true of general conversation, but is often true of conversations between telephone operators and people. Phrases are specified which have specific substitution and deletion penalties, for example the two phrases "I would like to" and "can I" may be specified as a possible substitution with low or zero penalty. Thus allows common equivalent phrases are given low substitution penalties. Insignificant phrases such as 'erm' are given low or zero deletion penalties.

19 Claims, 6 Drawing Sheets

OTHER PUBLICATIONS

Edgington et al., "Building an Automatic Receptionist–A Framework for Spoken Language Call Steering", Procs Institute of Acoustics. Speech and Hearing (Windermere), vol. 20, part 6 (1998).

McInnes, "Analysis of Telephone Number Transfers in Operator Dialogues", Apr. 27, 1999, www.legend.bt.co.uk/filing/dlg/sys/red/rep/014_b.doc.

Attwater et al., "Towards Fluency–Structured Dialogues with Natural Speech Input", AVIOS 1997 Conference Paper, Issue 1, Jul. 27, 1997.

Buntschuh et al., "VPQ: A Spoken Language Interface to Large Scale Directory Information", AT&T Labs—Research.

Wright et al., "Spoken Language Understanding Within Dialogs Using a Graphical Model of Task Structure", AT&T Labs—Research.

Prieto et al, "Learning Language Models Through the ECGI Method", Speech Communication, NL, Elsevier Science Publishers, Amsterdam, vol. 11, No. 2/03, Jun. 1, 1992, pp. 299–309.

Rohlicek, "Gisting Conversational Speech", Proceedings of the International Conference on Acoustics, Speech and Signal Processing (ICASSP), US, New York, IEEE, vol. Conf. 17, 1992, pp. 113–116.

Giachin, "Automatic Training of Stochastic Finite–State Language Models For Speech Understanding", Proceedings of the International Conference on Acoustics, Speech and Signal Processing (ICASSP), US, New York, IEEE, vol. Conf. 17, 1992, pp. 173–176.

* cited by examiner

LEARNING OF DIALOGUE STATES AND LANGUAGE MODEL OF SPOKEN INFORMATION SYSTEM

This application is the US national phase of international application PCT/GB00/04904 filed 19 Dec. 2000 which designated the U.S.

BACKGROUND OF THE INVENTION

1. Field of the Invention

This invention relates to the automatic classification of sequences of symbols, in particular of sequences of words for use in the production of a dialogue model, in particular to the production of a dialogue model for natural language automated call routing systems. This invention also relates to the generation of an insignificant symbol set and of an equivalent symbol sequence pair set for use in such automatic classification.

2. Detailed Description of Related Art

In a call routing service utilising a human operator, user requests may be categorised into 4 types. An explicit user request is where the user knows the service which is required, for example "Could you put me through to directory enquiries please?". An implicit user request is where the user does not explicitly name the service required, for example "Can I have the number for . . . please?". A general problem description is where the customer does not know which service they require, but expects the operator to be able to help. The operator generally engages in a dialogue in order to identify the required service. The final category is 'other' where there is confusion about the problem, or what the service can do.

Automated call routing can be achieved by the use of a touch tone menu in an interactive voice response (IVR) system. It is widely accepted that these systems can be difficult to use, and much skill is needed in the design of suitable voice menu prompts. Even designs using best-practice have several fundamental weaknesses. In particular, the mapping from system function to user action (pressing a key) is usually completely arbitrary and therefore difficult to remember. To alleviate this problem, menus must be kept very short, which can lead to complex hierarchical menu structures which are difficult to navigate. In addition, many users have significant difficulty in mapping their requirements onto one of the listed system options. Touch tone IVR systems can be effective for explicit user requests, may sometimes work with implicit user requests, but are inappropriate for general problem descriptions or confused users.

Spoken menu systems are the natural extension of touch tone IVR systems which use speech recognition technology. Their main advantages are a reduction in the prompt length, and a direct relationship between meaning and action—for example saying the word 'operator' rather than pressing an arbitrary key. However, many of the limitations of touch tone systems remain: the difficulty of mapping customer requirements onto the menu options, and a strictly hierarchical navigation structure. There is also the added difficulty of non-perfect speech recognition performance, and the consequent need for error recovery strategies.

Word spotting can be used in a system which accepts a natural language utterance from a user. For some applications word spotting is a useful approach to task identification. However some tasks, for example line test requests are characterised by high frequencies of problem specification, so it is difficult if not impossible to determine the task which is required using word spotting techniques.

The use of advanced topic identification techniques to categorise general problem descriptions in an automated natural language call steering system is the subject of ongoing research, for example, the automated service described by A. L. Gorin et al in "How May I Help You" Proc of IVTTA, pp57–60, Basking Ridge, September 1996, uses automatically acquired salient phrase fragments for call classification. In contrast, other studies either do not consider this type of request at all, or attempt to exclude them from automatic identification.

In the above reference automated service, a classifier is trained using a set of speech utterances which are categorised as being directed to ones of a set of predetermined set of tasks. The problem which this prior art system is that the tasks need to be predetermined, and in this case are defined to be the operator action resulting from the entire interaction. The relationship between the required action, and the operator dialogue necessary to determine the action is not easily discovered. In a manual call routing system there are often multiple dialogue turns before an operator action occurs. It is desirable for an automated natural language call steering system to behave in a similar way to a manually operated call steering system for at least a subset of operator supplied services. In order to do this it is necessary to have a dialogue model which can deal with a range of different styles of enquiries.

BRIEF DESCRIPTION OF THE INVENTION

According to one aspect of the present invention there is provided a method of classifying a plurality of sequences of symbols to form a plurality of sets of sequences of symbols comprising the steps of determining a distance between each sequence and each other sequence in said plurality of sequences in dependence upon a set of insignificant symbol sequences and a set of equivalent symbol sequence pairs; and grouping the plurality of sequences into a plurality of sets in dependence upon said distances.

Preferably the symbols are words transcribed from operator speech signals generated during an enquiry to a call centre. The words may be transcribed from operator speech signals using a speaker dependent speech recogniser.

According to a second aspect of the invention there is also provided a method of generating a set of insignificant symbol sequences for use in the method of the first aspect of this invention, comprising the steps of classifying a plurality of sequences of symbols into a plurality of sets; for each of the sets, determining an optimal alignment between each sequence thereof and each other sequence in that set; and allocating a symbol or sequence of symbols having been deleted to obtain an optimal alignment between two sequences of a set.

According to a third aspect of the invention there is provided a method of generating a set of equivalent symbol sequence pairs for use in the method of the first aspect of this invention, comprising the steps of classifying a plurality of sequences of symbols into a plurality of sets; determining an optimal alignment between each sequence in a set and each other sequence in that set; and allocating a pair of symbols or sequences of symbols to the set of equivalent symbol sequences, the symbols or sequences of symbols having been substituted for each other to obtain an optimal alignment between two sequences of a set.

A method of generating a grammar for enquiries made to a call centre, using the plurality of sets of sequences of words generated according to the first aspect of the present invention comprising the steps of transcribing a plurality of enquiries according to which of the sets the sequences of words in the enquiry occur; and generating a grammar in dependence upon the resulting transcription is also provided.

A method of measuring the occurrence of particular types of telephone enquiry received in a call centre using the plurality of subsets of sequences of words generated according to the method of the first aspect of the invention is also provided.

Apparatus for performing the methods of the invention are also provided.

BRIEF DESCRIPTION OF THE DRAWINGS

An embodiment of the invention will now be described, by way of example only, with reference to the accompanying drawings in which.

DETAILED DESCRIPTION OF EXEMPLARY EMBODIMENTS OF THE INVENTION

Figure 1:
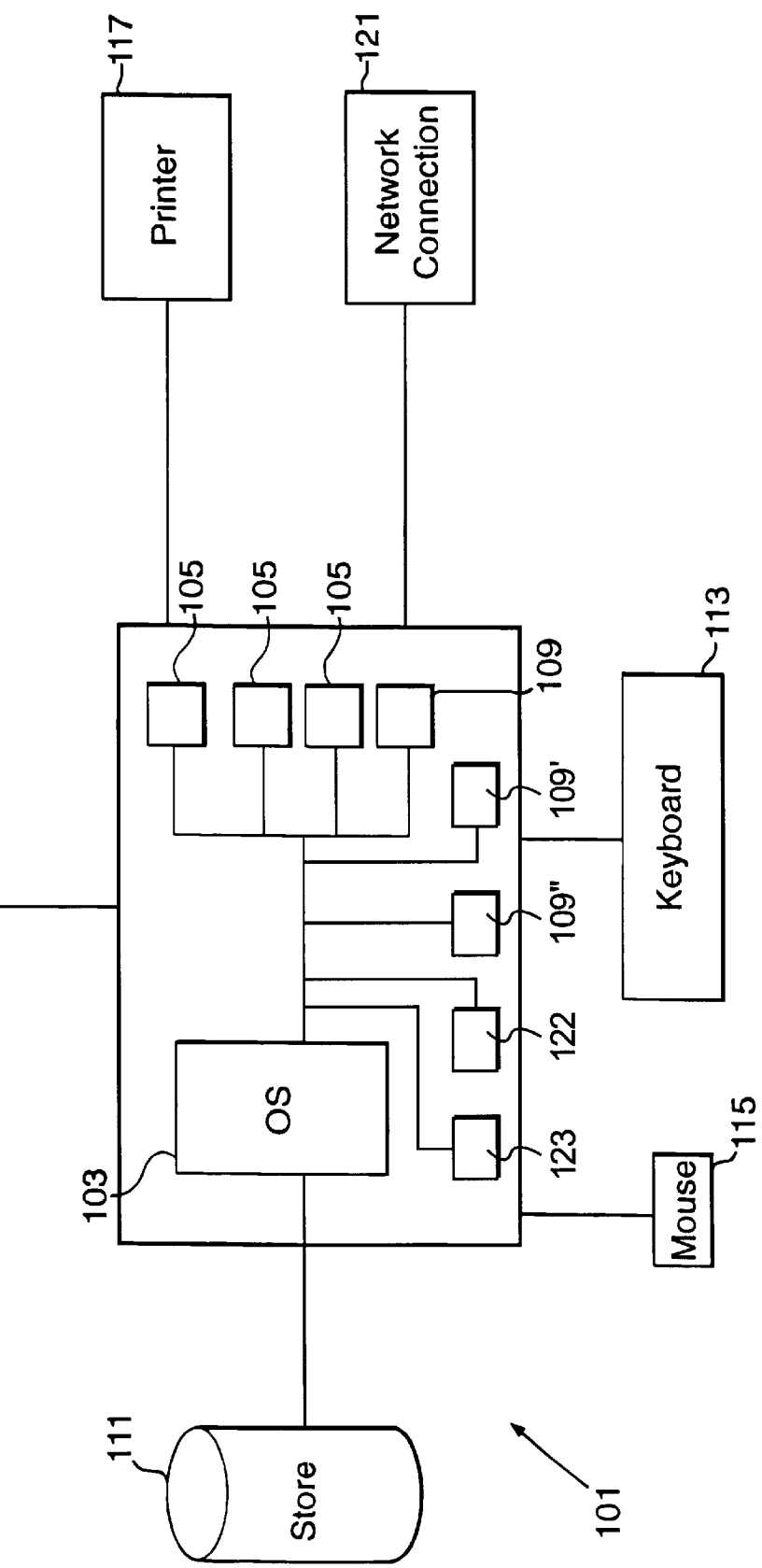
FIG. 1 is a schematic representation of a computer loaded with software embodying the present invention.

FIG. 1 illustrates a conventional computer 101, such as a Personal Computer, generally referred to as a PC, running a conventional operating system 103, such as Windows (a Registered Trade Mark of Microsoft Corporation), and having a number of resident application programs 105 such as a word processing program, a network browser and e-mail program or a database management program. The computer 101 also has suite of programs 109, 109', 109", 122 and 123 for use with a plurality of sequences of words (also described as sentences) transcribed from operator utterances in a call centre. The suite includes a dialogue state discovery program 109 that enables the sequences to be classified to form a plurality of sets of sequences. Programs 109' and 109" respectively allow a set of insignificant words and word sequences, and a set of equivalent word sequence pairs to be generated for use by the program 109. Program 122 uses the output of program 109 to generate a grammar for transcribed calls and program 123 uses the output of program 109 to measure statistics about the types of calls which are being handled in the call centre.

The computer 101 is connected to a conventional disc storage unit 111 for storing data and programs, a keyboard 113 and mouse 115 for allowing user input and a printer 117 and display unit 119 for providing output from the computer 101. The computer 101 also has access to external networks (not shown) via a network card 121.

Figure 2:
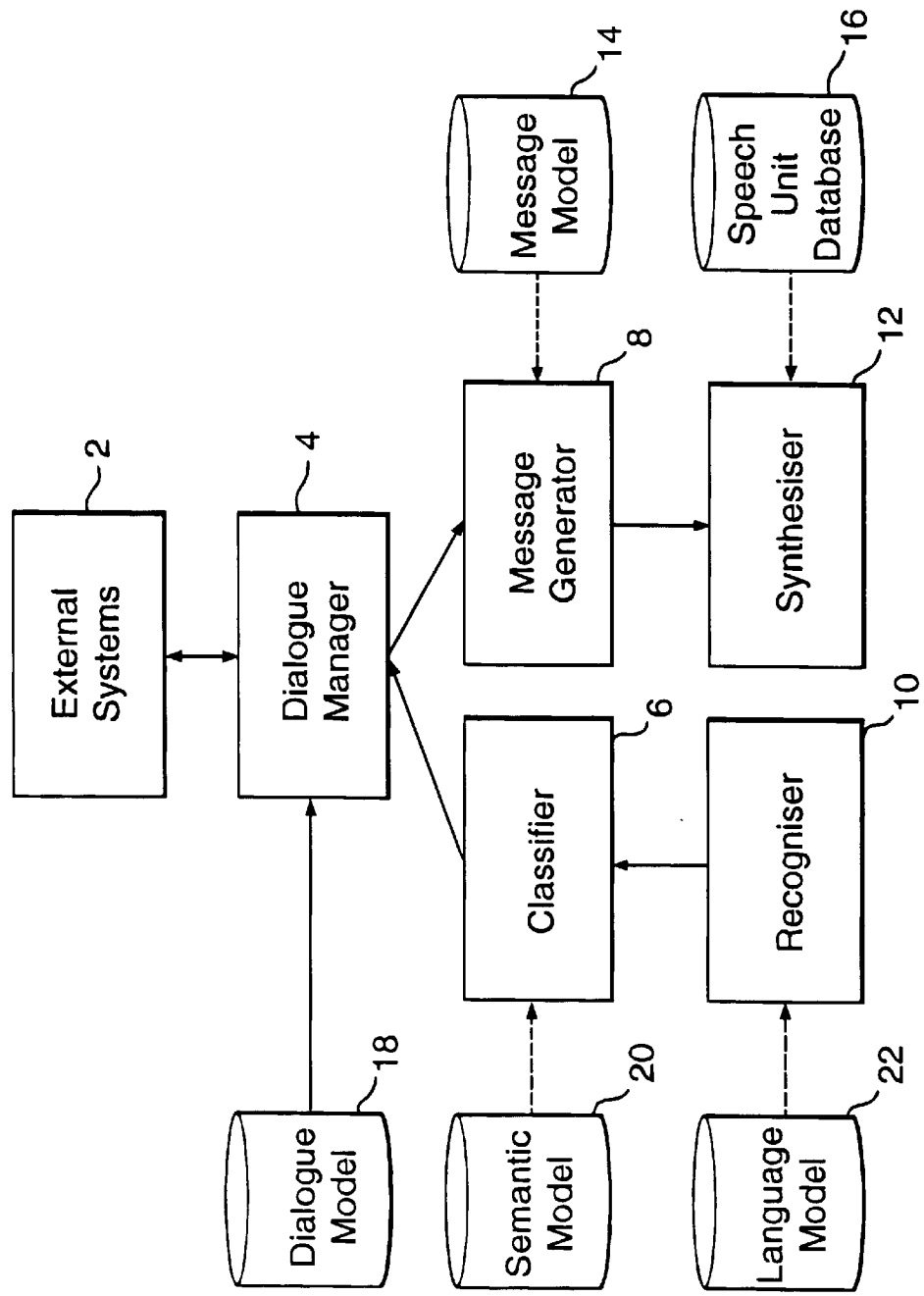
FIG. 2 shows a known architecture of a natural language system.

FIG. 2 shows a known architecture of a natural language call steering system. A user's speech utterance is received by a speech recogniser 10. The received speech utterance is analysed by the recogniser 10 with reference to a language model 22. The language model 22 represents sequences of words or sub-words which can be recognised by the recogniser 10 and the probability of these sequences occurring. The recogniser 10 analyses the received speech utterance and provides as an output a graph which represents sequences of words or sub-words which most closely resemble the received speech utterance. Recognition results are expected to be very error prone, and certain words or phrases will be much more important to the meaning of the input utterance that others. Thus, confidence values associated with each word in the output graph are also provided. The confidence values give a measure related to the likelihood that the associated word has been correctly recognised by the recogniser 10. The output graph including the confidence measures are received by a classifier 6, which classifies the received graph according to a predefined set of meanings, with reference to a semantic model 20 to form a semantic classification. The semantic classification comprises a vector of likelihoods, each likelihood relating to a particular one of the meanings. A dialogue manager 4 operates using a state based representation scheme as will be described more fully later with reference to FIG. 3. The dialogue manager 4 uses the semantic classification vector and information about the current dialogue state together with information from a dialogue model 18 to instruct a message generator 8 to generate a message, which is spoken to the user via a speech synthesiser 12. The message generator 8 uses information from a message model 14 to construct appropriate messages. The speech synthesiser uses a speech unit database 16 which contains speech units representing a particular voice.

Analysis of human—human operator service calls show nearly half of callers specify a problem, they do not request a particular service; approximately one fifth ask the operator to do something but do not actually use an explicit service name; approximately a third explicitly ask for a particular service; and 2% speak outside the domain of the service offered (e.g. obscene calls).

After 10,000 calls have been received a new word is still observed in one in every four calls, therefore the language model 22 has to be able to deal with previously unseen words. Callers are very disfluent, 'uhms', 'ers' and restarts of words are common, therefore recognition accuracy is likely to be poor. The distribution of certain request types is very skewed. Some, for example problems getting through, are very common. A large proportion of calls are relatively simple to resolve once the problem/request has been correctly identified. Therefore, although the language used by the user to describe problems may be complex, a fairly crude set of predetermined meanings may suffice to identify and correctly deal with a large proportion of callers.

In dialogue modelling, 'games theory' is often used to describe conversations. A brief description of games theory follows, so that the terminology used in the following description may be understood. Games theory suggests that human—human conversations can be broken down into specific games which are played out by the participants, each participant taking 'turns' in the dialogue. These games are made up of a number of moves, and multiple dialogue moves may be made in a single dialogue turn. For example 'reverse charge, thank-you, to which code and number?' is a single turn comprising two moves. Games played out are specific to a task. Games are considered to obey a stack based model, i.e. once one game is complete then the parent game is returned to unless a new child game is simultaneously initiated in its place.

The dialogue manager 4 interfaces to external systems 2 (for example, a computer telephony integration link for call control or customer records database). The dialogue manager 4 controls transitions from and to dialogue states. In known systems dialogue states are usually selected by the designer and usually relate to a specific question or a specific statement, which are known as dialogue moves when the games theory, as described above, is applied to dialogue analysis.

In this invention the dialogue model is trained using a training corpus of example human—human dialogues. Dialogue states are modelled at the turn level rather than at the move level, and the dialogue states are derived from the training corpus.

Figure 3:
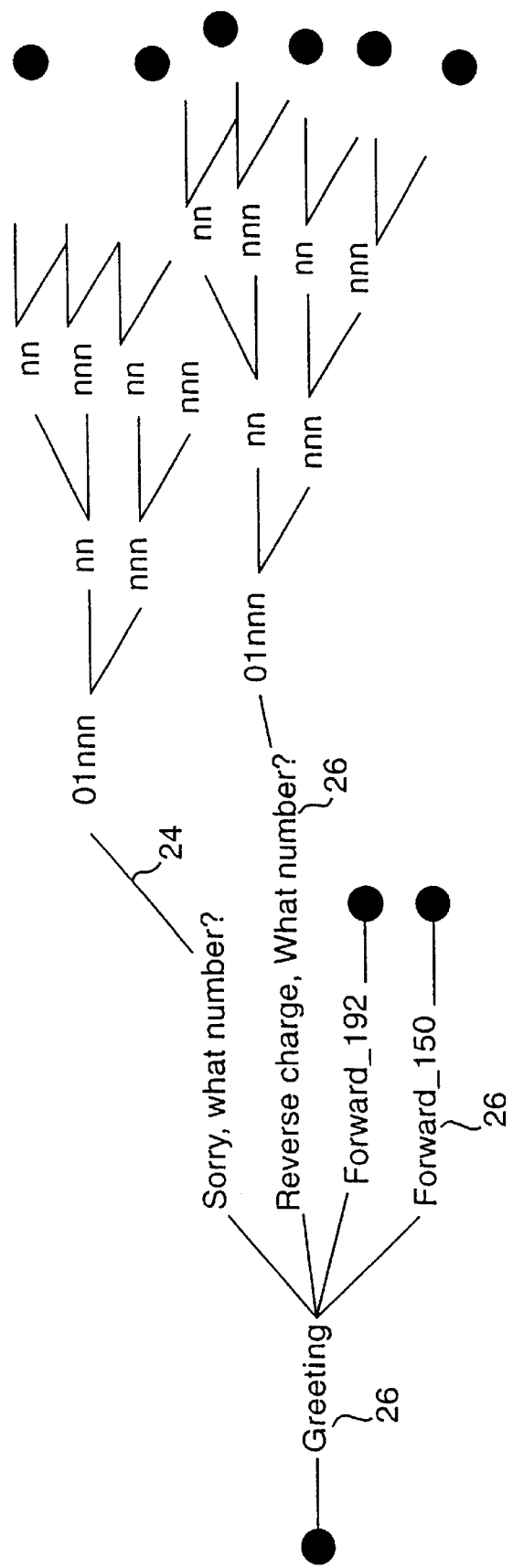
FIG. 3 represents part of a simple dialogue structure for an operator interaction.

FIG. 3 represents part of a simple dialogue structure for an operator interaction, represented as a tree grammar. Arcs 24 represent customer turns (which have not been annotated), and nodes 26 represent operator turns (which have been annotated with the operator utterance). The top path for example represents the instance where a customer has reported a fault on a line, the operator apologises, and asks which code and number, and then echoes the required number back to the user. In this portion, the symbol n represents any number or the word 'double'.

The assumption underlying this style of representation is that the range of operator dialogue moves and turns is actually quite small in many services and therefore may be categorised into a set of predetermined meanings. This is an important assumption which is not true of general conversation, but is often true of conversations between telephone operators and people.

Figure 4:
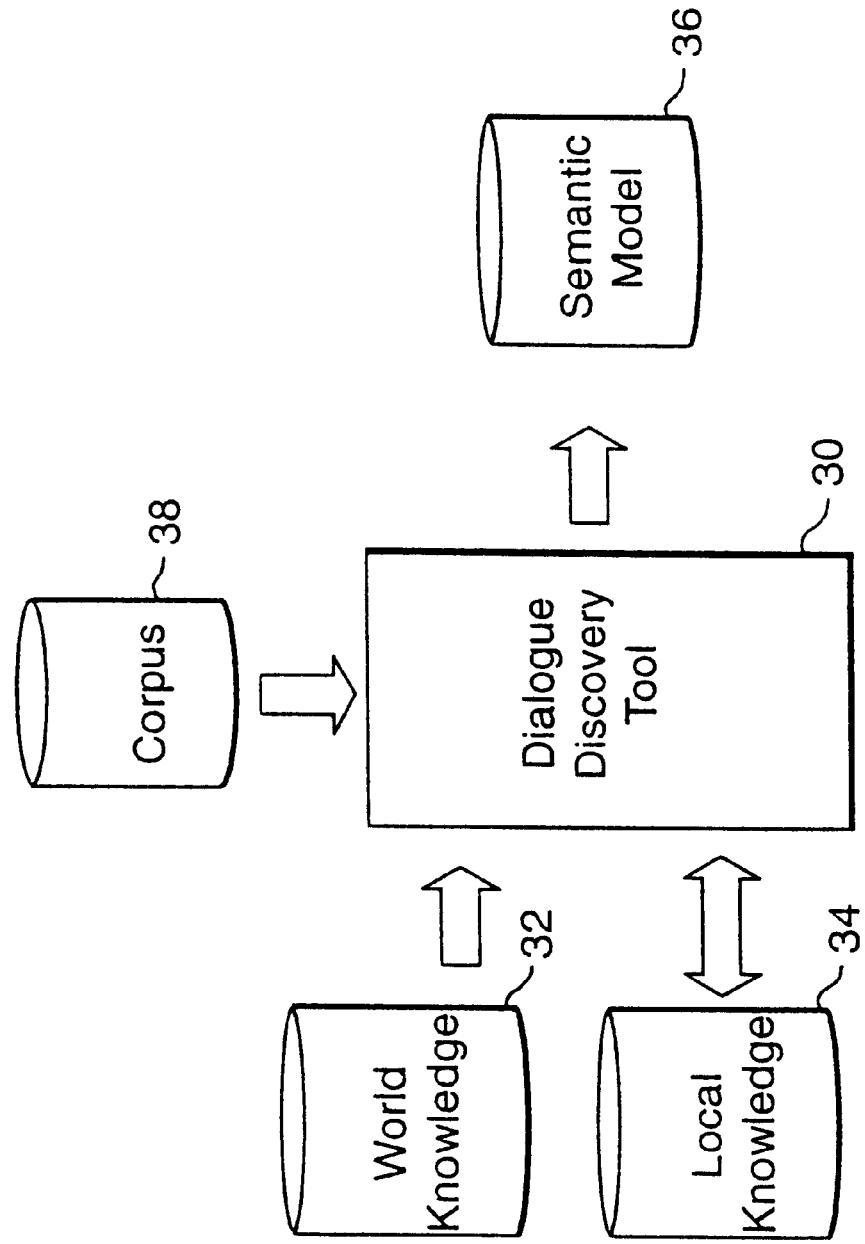
FIG. 4 shows the architecture of a dialogue discovery tool.

FIG. 4 shows a dialogue discovery tool 30. The dialogue discovery tool 30 uses a world knowledge database 32 which contains information such as lists of town names, surnames and ways of saying dates and times. A local knowledge database 34 is used by the dialogue discovery tool 30 in generating a semantic model 36 suitable for use in the natural language call steering system of FIG. 2. During use the dialogue discovery tool 30 adds information to the local knowledge database 34 according to data read from a corpus 38 of call examples.

The operation of the dialogue discovery tool 30 will now be described in more detail with reference to FIG. 5. The dialogue discovery tool 30 aims to discover the operator dialogue turns which have the same dialogue function as far as the caller is concerned. For example 'sorry about that, which code and number is that?' and 'I'm sorry, what code and number is that please?' have the same dialogue function. Also in the example of FIG. 3 blocks of numbers of particular sizes are considered to have the same dialogue function regardless of the specific numbers involved.

Figure 5:
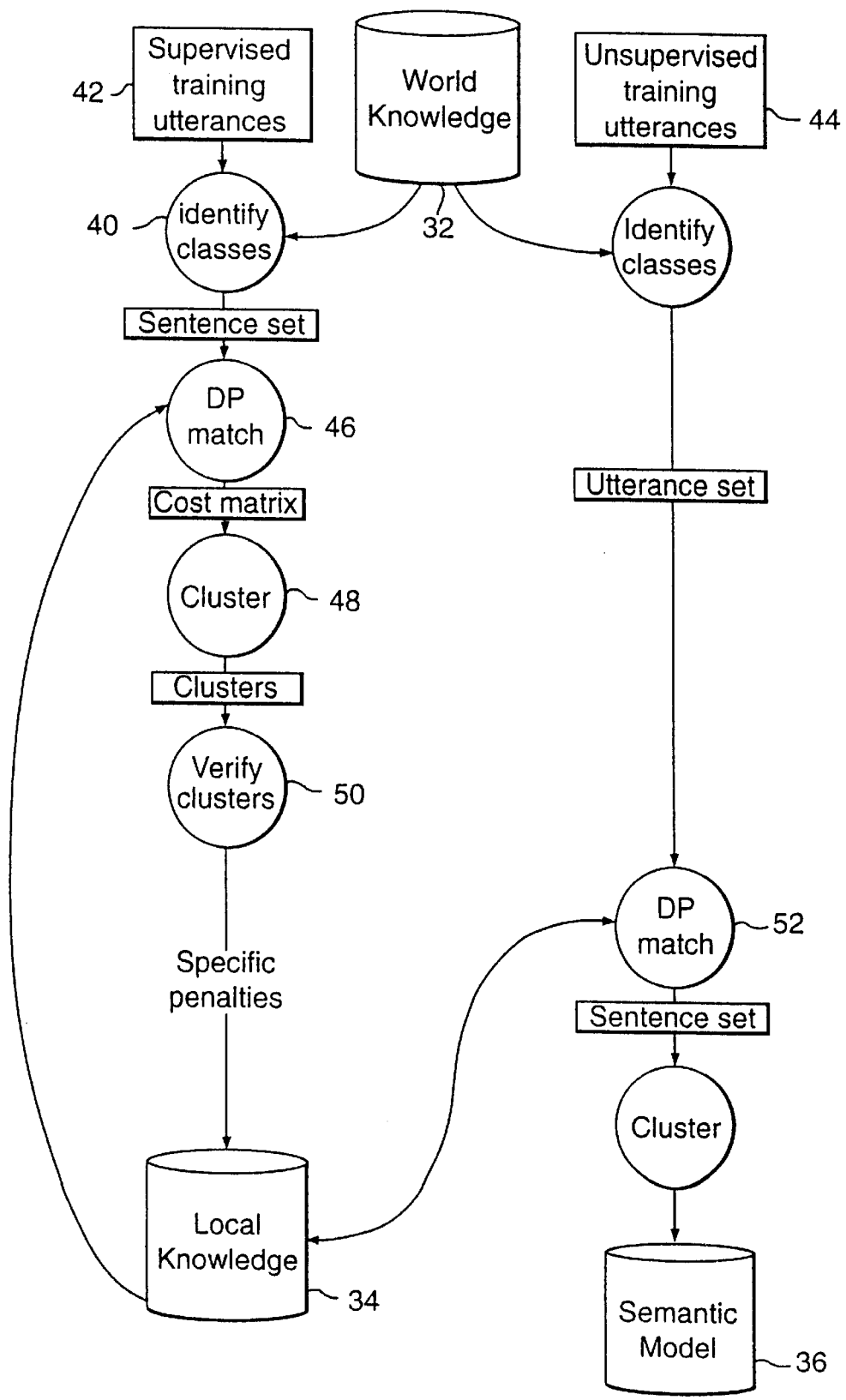
FIG. 5 is a flow chart showing the operation of the dialogue discovery tool of FIG. 4.

FIG. 5 shows diagrammatically the process of generating data for the local knowledge database 34 and the semantic model 36. The corpus 38 is separated into a supervised training corpus 42 and an unsupervised training corpus 44. Each sentence in each corpus is assumed to comprise a sequence of tokens (also referred to as words in this specification) separated by white space. Each token comprises a sequence of characters. Initially at step 40 world knowledge data from the world knowledge database 32 is used to identify classes in the training corpus. These classes may be represented by context free grammar rules defining members of the class—for example, all town names may be listed and mapped to a single token as it is regarded that all town names perform the same dialogue function. A dynamic programming (DP) match is then performed at step 46. The DP match aligns each sentence with each other sentence by optimally substituting tokens for each other and/or deleting tokens as will be described in more detail below. The DP match uses any local knowledge in the local knowledge database 34 which has been stored previously. The sentences in the supervised training corpus 42 are clustered using a clustering algorithm at step 48. The clustering algorithm used in this embodiment of the invention will be described later with reference to FIG. 6. The clustering algorithm produces clusters of sentences which are regarded as having the same dialogue function, and one 'cluster' for sentences which are not similar to any of the other sentences. The clusters thus generated are manually checked at step 50. The words which have been deleted in forming a cluster are stored in the local knowledge database 34 as representing insignificant words or phrases. The words or phrases which have been substituted for each other in forming a cluster are stored in the local knowledge database 34 as representing synonymous words or phrases. Data stored in the local knowledge database 34 and the world knowledge data base 32 are then used by a DP match process at step 52 to form dialogue states using the unsupervised training corpus 44. The unsupervised training corpus may include sentences from the supervised training corpus 42.

The training corpus 38 comprises operator utterances. The corpus is created by listening to operator utterances and transcribing the words manually. It is also possible to train a speaker dependent speech recogniser for one or more operators and to automatically transcribe operator utterances using the speaker dependent speech recogniser. The advantage of this approach is that the database can be created automatically from a very large number of calls, for example, all the operator calls in an entire week could be used. The disadvantage is that the transcriptions are likely to be less accurate than if they were generated manually.

The DP match algorithm performed at steps 46 and 52 in FIG. 5 will now be described in detail, and some examples given. The DP match algorithm is used to align two sentences. The algorithm uses a standard DP alignment with a fixed general penalty for single insertions, deletions and substitutions. The alignment is symmetrical, i.e. deletions and insertions are treated as the same cost. For this reason, only deletions are mentioned.

In addition to the fixed general penalty for deletion and substitution, any number of specific substitutions and deletions may be specified along with their specific penalties. These specific substitution and deletion penalties may apply to sequences of tokens, for example the two phrases 'I would like to' and 'can I' may be specified as a possible substitution with low or zero penalty. This allows common equivalent phrases to be given lower substitution penalties than DP alignment using the fixed general penalty would assign them. The use of specific penalties also allows for insignificant phrases, e.g. 'erm', to be given low or zero deletion penalties.

In addition to being able to use particular substitution and deletion penalties particular substitutions and deletions and their associated penalties, which were necessary in order to obtain the alignment which resulted in the lowest total penalty are determined. These penalties may then be stored in the local knowledge database 34 and used in another iteration of the DP match. Without modification, this would give exactly the same result as the first iteration. However, if these specific penalties are reduced, the alignment will be biased towards deleting or substituting these particular tokens or sequences of tokens.

Assume two sentences are represented by $S_x$ and $S_y$. At the start and the end of each sentence an additional token '#' is appended as a sentence boundary marker. $L_x$ and $L_y$ represent the length (including sentence boundary markers)

of sentences $S_x$ and $S_y$.$w_i^x$, stands for the i'th word in sentence $S_x$ indexed from the zero'th word. Hence:

$$w_0^x = \text{'\#'}$$

and $$w_{(L_x-1)}^x = \text{'\#'}$$

We are going to populate an $L_x$ by $L_y$ array d, starting with d(0,0), such that the element $d(L_x-1, L_y-1)$ of the array will give the minimum distance $D(S_x, S_y)$ which represents the lowest possible cumulative penalty for aligning $S_x$ and $S_y$.

The definition of d is recursive.

$$d(0,0)=0.$$

$$d(i,j)=\min[O(i,j), P(i,j), Q(i,j)]$$

Where the functions $O(i,j)$, $P(i,j)$ and $Q(i,j)$ each represent a possible contribution due to penalties for deletion of tokens in $S_x$, penalties for deletion of tokens in $S_y$ and penalties for substitution of tokens between $S_x$ and $S_y$ respectively. A minimum of these in turn gives the minimum distance at point d(i,j).

For the a general DP match $O(i,j)$, $P(i,j)$ and $Q(i,j)$ are defined as follows:

For two words $w_i^x$, $w_j^y$ $$c(w_i^x, w_j^y) = 0 \text{ if } w_i^x = w_j^y$$

otherwise $$c(w_i^x, w_j^y) = 1$$

and $$O(i,j) = (d(i-1,j)+A) \text{ for } (i>0) \text{ else } O(i,j) = \infty$$

$$P(i,j) = (d(i,j-1)+A) \text{ for } (j>0) \text{ else } P(i,j) = \infty$$

$$Q(i,j) = (d(i-1,j-1)+B.c(w_i^x, w_j^y)) \text{ for } (j>0, i>0) \text{ else } Q(i,j) = \infty$$

Where A=general deletion penalty and B=general substitution penalty.

It has been found that a normalised distance is useful when comparing sentences of different lengths. The maximum possible cost $m(L_x, L_y)$ between two sentences of length $L_x, L_y$ is $$m(L_x, L_y) = A.abs(L_x - L_y) + B.\min(L_x - 2, L_y - 2)$$

if 2A>B otherwise $$m(L_x, L_y) = A.(L_x + L_y - 4)$$

The normalised cost $N(S_x, S_y)$ is $$N(S_x, S_y) = \frac{D(S_x, S_y)}{m(L_x, L_y)}$$

The DP match is extended in this invention to include specific penalties. Specific penalties are defined as follows for certain substitutions or deletions of tokens or sequences of tokens. These specific penalties are stored in the local knowledge database 34. Taking the case of deletions first, the deletion penalty $p(w_a w_b \ldots w_N)$ giving the penalty of deleting the arbitrary token sequence $w_a, w_b \ldots w_N$ is $$p(w_a w_b \ldots w_N) = \text{value}$$

where value is defined in a look-up table. If value has not been specified in the look-up table then the general penalties apply:

$$p(w_a) = A \text{ (for only one token deleted)}$$

otherwise $p(w_a w_b \ldots w_N) = \infty$ (for deletion of sequences of tokens)

Similarly, for specific substitution penalties, let the substitution penalty $q(v_a v_b \ldots v_N w_a w_b \ldots w_M)$ giving the cost of substituting an arbitrary word sequence $v_a v_b \ldots v_N$ with another arbitrary word sequence $w_a w_b \ldots w_M$ or vice versa be defined as:

$$q(v_a v_b \ldots v_N, w_a w_b \ldots w_N) = \text{value}$$

where value may be defined in a look-up table. If value has not been specified in the look-up table then the general substitution penalties apply:

$q(v_a, w_a) = B.c(v_a, w_a)$ (for substitution of a single token with a single token)

otherwise $q(v_a v_b \ldots v_N, w_a w_b \ldots w_N) = \infty$ (for substitutions of a sequence of token with a sequence of tokens)

The functions $O(i,j)$, $P(i,j)$ and $Q(i,j)$ are re-defined as follows:

$$O(i,j) = \min_{k=0..i-1}(d(i-k-1, j) + p(w_{i-k}^x \ldots w_i^x))] \quad \text{for } (i>0)$$
$$\text{else } O(i,j) = \infty$$

$$P(i,j) = \min_{l=0..j-1}(d(i, j-l-1) + p(w_{j-l}^y \ldots w_j^y))] \quad \text{for } (j>0)$$
$$\text{else } P(i,j) = \infty$$

$$Q(i,j) = \min_{k=0..j-1, l=0..j-1}(d(i-k-1, j-l-1) + \quad \text{for } (j>0, i>0)$$
$$q(w_{i-k}^x \ldots w_i^x, w_{j-l}^y \ldots w_j^y)))] \quad \text{else } Q(i,j) = \infty$$

The above equations are equivalent to the general equations in the case where there are no specific deletion and substitution penalties defined.

Expressions which evaluate to infinity may be ignored in the calculation. Therefore if there are few specific deletion and substitution penalties, this algorithm is still fairly efficient. For a given sentence $S_x$ all of the possible deletion and substitution penalties which may be relevant for a given word in $S_x$ may be calculated once only for the sentence, regardless of which sentence it is to be compared with.

In addition to knowing the minimum distance between two sentences, the optimal alignment between the sentences needs to be known so that specific penalties may be calculated for future use during a unsupervised DP match. This optimal alignment may be regarded as the route through the matrix d(i,j) which leads to the optimal solution, $d(L_x-1, L_y-1)$. A matrix t(i,j) of two-dimensional vectors is defined which is used to find the optimal alignment. These vectors store the value pair (k+1,l+1) for the value of k and l which caused the minimum solution to be found for d(i,j). k and l may have come from $O(i,j), P(i,j)$ or $Q(i,j)$ depending upon which was the minimum solution. Thus the two components of $t^x(i,j)$ and $t^y(i,j)$ are defined as:

$$t^x(i,j) = 1 + \text{argmin}_k(d(i,j))$$

$$t^y(i,j) = 1 + \text{argmin}_l(d(i,j))$$

The traceback matrix t(i,j) may then be used to align the two sentences $S_x$ and $S_y$ optimally against one another. Defining an iterator h, we can recursively traceback from $d(L_x-1, L_y-1)$ to discover a sequence of co-ordinate pairs $v^x(h)$ and $v^y(h)$ of all points visited in the optimal alignment.

$$v^x(0) = L_x - 1$$

$$v^y(0) = L_y - 1$$

$$v^x(h) = v^x(h-1) - t^x(v^x(h-1)) \quad h > 0$$

$$v^y(h) = v^y(h-1) - t^y(v^y(h-1)) \quad h > 0$$

This traceback ends when $v^x(h)$ and $v^y(h)$ both equal zero. i.e. the origin is reached. The value of h at this point is equal to the number of alignment steps required to align the two sentences $S_x$ and $S_y$. This gives us a vector of traceback fragments for each sentence given by:

$$f_x(h) = w^x_{v^x(h)} \ldots w^x_{1+v^x(h-1)}$$

$$f_y(h) = w^y_{v^y(h)} \ldots w^y_{1+v^y(h-1)}$$

$$1 \leq h \leq h_{max}$$

Discovered Substitutions and Deletions

The trace back vector can be used to discover the substitutions and deletions which were necessary to match the two sentences. It is trivial to identify single word substitutions or deletions which were required, but it is advantageous to discover the largest possible sequences of words which were substituted or deleted. This is done by finding sequences of words in the aligned sequences which occur between substitutions or deletions of zero cost. First of all we derive a vector of cost differences for index h.

$$\delta(h) = d(v(h)) - d(v(h+1)) \quad 0 <= h <= h_{max}$$

$$\delta(h_{max}) = 0$$

This vector has value zero for all substitutions or deletions which had zero penalties (these will simply be matching words if there are no specific penalties active) Maximum length adjacent sequences of non-zero values in the cost differences vector define the discovered specific penalties (deletion penelties p( ) and substitution penalties q( )).

An example of the above algorithm in operation will now be described. Assume it is required to align the sentences (including the end of sentence tokens) "# thankyou reverse the charges #" and "# reverse charge #".
If A=7 and B=10 then
d(i,j)=

|   | # | thankyou | reverse | the | charges | # |
|---|---|----------|---------|-----|---------|---|
| # | 0.00 | 7.00 | 14.00 | 21.00 | 28.00 | 35.00 |
| reverse | 7.00 | 10.00 | 7.00 | 14.00 | 21.00 | 28.00 |
| charge | 14.00 | 17.00 | 14.00 | 17.00 | 24.00 | 31.00 |
| # | 21.00 | 24.00 | 21.00 | 24.00 | 27.00 | 24.00 | t(i,j)=

|   | # | thankyou | reverse | the | charges | # |
|---|---|----------|---------|-----|---------|---|
| # | 0,0 | 1,0 | 1,0 | 1,0 | 1,0 | 1,0 |
| reverse | 0,1 | 1,1 | 1,0 | 1,0 | 1,0 | 1,0 |

-continued

|   | # | thankyou | reverse | the | charges | # |
|---|---|----------|---------|-----|---------|---|
| charge | 0,1 | 1,1 | 0,1 | 1,1 | 1,1 | 1,1 |
| # | 0,1 | 1,1 | 0,1 | 1,1 | 1,1 | 1,1 |

Alignment:

| h |   |   |   |
|---|---|---|---|
| 5 | # | # | 0.0 |
| 4 | thankyou |   | 7.0 |
| 3 | reverse | reverse | 7.0 |
| 2 | the |   | 14.0 |
| 1 | charges | charge | 24.0 |
| 0 | # | # | 24.0 |

Discovered Substitutions/Deletions
q(the charges,charge)=17.0
p(thankyou)=7.0

Now it is possible to reduce these penalties and store them in the local knowledge database 34 for use in future alignment processes.

For example if
General Deletion Penalty A=7
General Substitution Penalty B=10
  Particular Substitutions:
  q(charge, the charges)=0.0 (i.e. these phrases are synonymous)
  Particular Deletions:
  p(thankyou)=0.0 (i.e. thankyou is irrelevant to the meaning of the phrase)
and it is required to align the sentences (including the end of sentence tokens) "# thankyou reverse the charges #" and "# reverse charge #" the matrices are now as follows:
Cost Matrix: d(i,j)

|   | # | thankyou | reverse | the | charges | # |
|---|---|----------|---------|-----|---------|---|
| # | 0.00 | 0.00 | 7.00 | 14.00 | 21.00 | 28.00 |
| reverse | 7.00 | 7.00 | 0.00 | 7.00 | 14.00 | 21.00 |
| charge | 14.00 | 14.00 | 7.00 | 10.00 | 0.00 | 7.00 |
| # | 21.00 | 21.00 | 14.00 | 17.00 | 7.00 | 0.00 |

Traceback Matrix: t(i,j)

|   | # | thankyou | reverse | the | charges | # |
|---|---|----------|---------|-----|---------|---|
| # | 0,0 | 1,0 | 1,0 | 1,0 | 1,0 | 1,0 |
| reverse | 0,1 | 1,0 | 1,1 | 1,0 | 1,0 | 1,0 |
| charge | 0,1 | 1,0 | 0,1 | 1,1 | 2,1 | 1,0 |
| # | 0,1 | 1,0 | 0,1 | 1,1 | 0,1 | 1,1 |

Alignment:

| h: |   |   |   |
|---|---|---|---|
| 4 | # | # | 0.0 |
| 3 | thankyou | — | 0.0 |
| 2 | reverse | reverse | 0.0 |

-continued

| h: | | | |
|---|---|---|---|
| 1 | the charges | charge | 0.0 |
| 0 | # | # | 0.0 |

Discovered Substitutions
none

Therefore the penalty for aligning the sentences is now 0.

Figure 6:
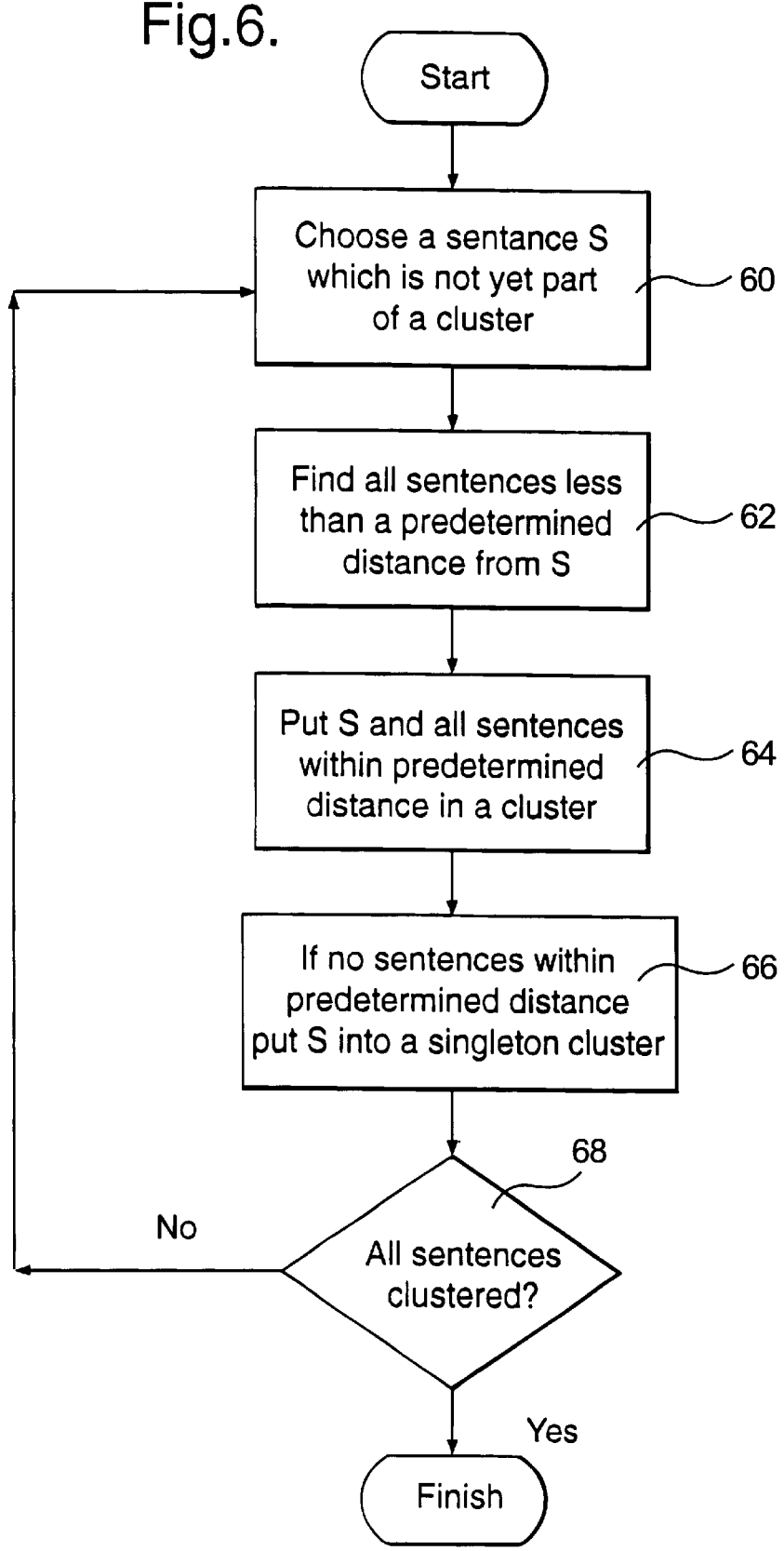
FIG. 6 is a flow chart showing the operation of a clustering algorithm of FIG. 5.

The clustering algorithm used in this embodiment of the invention will now be described with reference to FIG. 6 assuming that all the sentences have been aligned, as described above, with all other sentences in the database and the minimum distance between each sentence and each other sentence has been recorded. At step 60 a sentence which does not yet form part of a cluster is chosen randomly from the database 34. At step 62 all other sentences which do not yet form part of a cluster with a minimum distance less than a predetermined distance are determined. At step 64 the randomly chosen sentence and the sentences determined at step 62 are placed into a cluster. At step 66, if no sentences were determined at step 62 then the randomly chosen sentence is placed in a 'cluster' which is reserved for sentence which do not cluster with any others. At step 68 a check is made as to whether all the sentences in the database 34 form part of a cluster, if so then the process terminates, otherwise steps 60–68 are repeated until all the sentences in the database form part of cluster. Each cluster may then be regarded as a discovered dialogue state.

Once the sentences in the training database have been clustered there are a number of possible uses for the data. Each call in the corpus 38 can be annotated according to the clusters (or discovered dialogue states) of each operator utterance in the call. Known techniques can then be used to generate a grammar, for example, a finite state network of dialogue states, or a bigram or n-gram grammar, for use in natural language automated call routing systems, for example.

If the corpus 38 is generated automatically it is also possible to use the determined dialogue states to generate statistics for various types of task being handled by the call centre. Statistics may be generated to determine the number and types of calls being handled by the operators.

As will be understood by those skilled in the art, the image classification program 109 can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of classifying a plurality of sequences of symbols to form a plurality of sets of sequences of symbols, the method comprising:
   a) determining a distance between each sequence and each other sequence in said plurality of sequences in dependence upon a set of semantically insignificant symbol sequences and a set of equivalent symbol sequence pairs; and
   b) grouping the plurality of sequences into a plurality of sets in dependence upon said distances;

wherein the symbols are words transcribed from call center operator speech signals spoken to a caller during an inquiry by the caller to the call center.

2. A method according to claim 1 wherein the words are transcribed from call center operator speech signals using a speaker dependent speech recogniser.

3. A method of generating a set of semantically insignificant symbol sequences for use in the method of claim 1, comprising:
   classifying a plurality of sequences of symbols into a plurality of sets;
   for each of the sets, determining an optimal alignment between each sequence thereof and each other sequence in that set; and
   allocating a symbol or sequence of symbols to the set of semantically insignificant symbol sequences, the symbol or sequence of symbols having been deleted to obtain an optimal alignment between two sequences of a set.

4. A method of generating a set of equivalent symbol sequence pairs for use in the method of claim 1, comprising:
   classifying a plurality of sequences of symbols into a plurality of sets;
   determining an optimal alignment between each sequence in a set and each other sequence in that set; and
   allocating a pair of symbols or sequences of symbols to the set of equivalent symbol sequences, the symbols or sequences of symbols having been substituted for each other to obtain an optimal alignment between two sequences of a set.

5. A method of generating a grammar for inquiries made to a call center, using the plurality of sets of sequences of words generated according to claim 1, comprising:
   transcribing a plurality of inquiries according to which of the sets the sequences of words in the enquiry occur; and
   generating a grammar in dependence upon the resulting transcription.

6. A method of measuring the occurrence of particular types of telephone inquiry received in a call center using the plurality of subsets of sequences of words generated according to claim 1.

7. An apparatus for classifying a plurality of sequences of symbols to form a plurality of sets of sequences of symbols, the symbols being words transcribed from call center operator speech signals spoken to a caller during an inquiry from the caller to the call center, the apparatus comprising:
   a store for storing a set of semantically insignificant symbol sequences;
   a store for storing a set of equivalent symbol sequence pairs;
   determining means connected to receive the transcribed call center operator speech signals and further arranged to determine a distance between each sequence and each other sequence in said plurality of sequences in dependence upon the set of semantically insignificant symbol sequences and the set of equivalent symbol sequence pairs; and
   means for grouping the plurality of sequences into a plurality of sets in dependence upon said distances.

8. An apparatus according to claim 7, further comprising a speaker dependent recogniser for transcribing call center operator speech signals generated during the inquiry by the caller to the call center.

9. An apparatus for generating a set of semantically insignificant symbol sequences for use by the apparatus of claim 7, comprising:

a classifier for classifying a plurality of sequences of symbols into a plurality of sets;

alignment means for determining an optimal alignment for each of the sets between each sequence thereof and each other sequence in that set; and means for allocating a symbol or sequence of symbols to the set of semantically insignificant symbol sequences, the symbol or sequence of symbols having been deleted to obtain an optimal alignment between two sequences of a set.

10. An apparatus for generating a set of equivalent symbol sequence pairs for use by the apparatus of claim 7, comprising:

a classifier for classifying a plurality of sequences of symbols into a plurality of subsets;

means for determining an optimal alignment between each sequence in a set and each other sequence in set; and means for allocating a pair of symbols or sequences of symbols to the set of equivalent symbol sequences, the symbols or sequences of symbols having been substituted for each other to obtain an optimal alignment between two sequences of a set.

11. An apparatus for generating a grammar for inquiries made to a call center by a caller comprising:

a store for storing a plurality of sets of sequences of words, the sequences having been classified into the sets by an apparatus according to claim 7;

means for transcribing a plurality of inquiries according to which of the sets of sequences of words in the inquiry occur; and means for generating a grammar in dependence upon the resulting transcription.

12. A data carrier loadable into a computer and carrying instructions for causing the computer to carry out the method according to claim 1.

13. A data carrier loadable into a computer and carrying instructions for enabling the computer to provide the apparatus according to claim 7.

14. A method of classifying a plurality of sequences of words to form a plurality of sets of sequences of words, the method comprising:

transcribing the plurality of sequences of words from call center operator speech signals spoken to a caller during an inquiry by the caller to the call center;

determining a distance between each sequence of words and each other sequence of words in said plurality of sequences; and grouping the plurality of sequences of words into a plurality of sets in dependence upon said distances.

15. A method according to claim 14, in which the words are transcribed from call center operator speech signals using a speaker dependent speech recogniser.

16. A method of generating a grammar for inquiries made by a caller to a call center, using the plurality of sets of sequences of words generated according to claim 14, comprising:

transcribing a plurality of inquiries according to which of the sets the sequences of words in the inquiry occur; and generating a grammar in dependence upon the resulting transcription.

17. A method of measuring the occurrence of particular types of telephone inquiry received in a call center using the plurality of subsets of sequences of words generated according to claim 14.

18. An apparatus for classifying a plurality of sequences of words to form a plurality of sets of sequences of words, the apparatus comprising:

transcribing means for transcribing the plurality of sequences of words from call center operator speech signals spoken to a caller during an inquiry by the caller to the call center;

determining means connected to receive the transcribed call center operator speech signals and further arranged to determine a distance between each sequence and each other semantically insignificant symbol sequences and the set of equivalent symbol sequence pairs; and means for grouping the plurality of sequences into a plurality of sets in dependence upon said distances.

19. An apparatus according to claim 18, wherein the transcribing means further comprise a speaker dependent recogniser for transcribing the call center operator speech signals generated during the inquiry from the caller to the call center.

* * * * *